(12) United States Patent
Badoiu

(10) Patent No.: US 8,352,494 B1
(45) Date of Patent: Jan. 8, 2013

(54) DISTRIBUTED IMAGE SEARCH

(75) Inventor: Mihai Badoiu, New York, NY (US)

(73) Assignee: Google Inc., Mountain View, CA (US)

( * ) Notice: Subject to any disclaimer, the term of this patent is extended or adjusted under 35 U.S.C. 154(b) by 106 days.

(21) Appl. No.: 12/632,681

(22) Filed: Dec. 7, 2009

(51) Int. Cl.
*G06F 7/00* (2006.01)
(52) U.S. Cl. ........... 707/772; 706/49; 707/780; 382/224
(58) Field of Classification Search ........................ None
See application file for complete search history.

(56) References Cited

U.S. PATENT DOCUMENTS

| | | | |
|---|---|---|---|
| 6,029,170 A * | 2/2000 | Garger et al. ........................ | 1/1 |
| 7,475,071 B1 | 1/2009 | Liu et al. | |
| 7,539,657 B1 * | 5/2009 | Liu et al. ........................ | 706/45 |
| 7,941,442 B2 * | 5/2011 | Li et al. ........................ | 707/780 |
| 2009/0304272 A1 | 12/2009 | Makadia et al. | |
| 2010/0027895 A1 * | 2/2010 | Noguchi et al. ............... | 382/224 |

OTHER PUBLICATIONS

Rachid Alaoui, Spatial Color Indexing: An Efficient and Robust Technique for Content-Based Image Retrieval, 2009, Journal of Computer Science, 5 (2); pp. 109-114.
Alexandr Andoni et al., "Near-Optimal Hashing Algorithms for Approximate Nearest Neighbor in High Dimensions", Foundation of Computer Science, 2006, FOCS '06, 10 pages.
Herve Jegou et al., "Hamming Embedding and Weak Geometric Consistency for Large Scale Image Search", Oct. 2008, In Proceedings of the European Conference on Computer Vision, 14 pages.
Sanjiv Kumar et al., "Content-Based Image Ranking", U.S. Appl. No. 12/547,303, filed Aug. 25, 2009, 29 pages.
Ting Liu et al., "An Investigation of Practical Approximate Nearest Neighbor Algorithms", 2004, MIT Press, 8 pages.
Ting Liu et al., "Clustering Billions of Images with Large Scale Nearest Neighbor Search", IIEEE Workshop on Applications of Computer Vision, Feb. 2007, Presented by Dafna Bitton on May 6th, 2008, for CSE 291, 59 pages.
Ameesh Makadia et al., "A New Baseline for Image Annotation", 2008, 27 pages.
Andrew W. Moore, "An Introductory Tutorial on kd-trees", Extract from Andrew Moore's PhD Thesis: Efficient Memory-based Learning for Robot Control, PhD. Thesis; Technical Report No. 209, Computer Laboratory, University of Cambridge, 1991, 20 pages.
Aibing Rao et al., "Spatial Color Histograms for Content-Based Image Retrieval", 1999, Proceedings 11th International Conference on Tools with Artificial Intelligence, 4 pages.
Dong Xu, "Applying a New Spatial Color Histogram in Mean-Shift Based Tracking Algorithm", 2005, In Image and Vision Computing New Zealand (IVCNZ), 6 pages.

(Continued)

*Primary Examiner* — Thu Nga Nguyen
(74) *Attorney, Agent, or Firm* — Fish & Richardson P.C.

(57) ABSTRACT

Methods, systems, and apparatus, including computer programs encoded on a computer storage medium, for distributed nearest-neighbor search for image retrieval are disclosed. An example distributed image retrieval system includes a root server and a plurality of leaf servers. The root server controls the clustering of images in the image corpus, and determines the assignment of image clusters to a collection of leaf servers. Each leaf server is independently configured to perform a two-stage nearest-neighbor search in a locality-sensitive hash space for a received query image within the leaf server's assigned images clusters. Thus, the distributed image retrieval system is modular and amendable to tuning, modifications, duplication, and replacement on a per-server basis. In addition, the design of the image retrieval system allows flexible load balancing among the leaf servers.

30 Claims, 9 Drawing Sheets

OTHER PUBLICATIONS

"Content-based image retrieval", Wikipedia, [retrieved on Oct. 22, 2009] Retrieved from the Internet: <URL: <http://www.en.wikipedia.org/wiki/Content-based_image_retrieval>, 6 pages.

"kd-tree", Wikipedia, [retrieved on Oct. 22, 2009] Retrieved from the Internet: <URL: <http://www.en.wikipedia.org/wiki/Kd-tree>, 7 pages.

"Hamming distance", Wikipedia, [retrieved on Oct. 22, 2009] Retrieved from the Internet: <URL: <http://www.en.wikipedia.org/wiki/Hamming_distance>, 4 pages.

"Locality sensitive hashing", Wikipedia, [retrieved on Oct. 22, 2009] Retrieved from the Internet: <URL: <http://www.en.wikipedia.org/wiki/Locality_sensitive_hashing>, 5 pages.

* cited by examiner

DISTRIBUTED IMAGE SEARCH

BACKGROUND

With the rapid increase of digital media (particularly digital images) on the Web, robust image search and retrieval have become an important task of internet search engines. Typically, internet image search exploits text-based annotations to retrieve relevant images responsive to text-based queries. However, in some search engines, image-based queries are enabled. A user can identify a query image for submission to the search engine, and the search engine returns a list of result images that are believed to be similar to the query image.

A common technique for identifying similar images to the query image is to perform a nearest-neighbor search for the query image in a multi-dimensional feature space. Each dimension of the multi-dimensional feature space is defined by one of multiple image features that characterize the similarities between images. For a given query image's feature vector, the goal is to find other images that have the nearest feature vectors according to some distance measure. Over the years, various methods for solving the nearest neighbor search problem have been developed.

SUMMARY

This specification describes technologies relating to image-based search. In general, one aspect of the subject matter described in this specification can be embodied in a method that includes generating a tree-based representation of an image corpus on a root server, where the tree-based representation include a plurality of leaf nodes, and each leaf node represents one of a plurality of image clusters in the image corpus in a multi-dimensional feature space. The plurality of image clusters is distributed among a plurality of leaf servers configured to communicate with the root server, such that each image cluster is assigned to a leaf server in the plurality of leaf servers. Each image cluster is mapped from the multi-dimensional feature space to a hash space such that each image in the image cluster is represented by a respective hash value in the hash space. The tree-based representation is searched on the root server to identify one or more image clusters to which a received query image belongs in the multi-dimensional feature space. The received query image is forwarded from the root server to one or more leaf servers that have been assigned the identified one or more image clusters. A nearest-neighbor search is performed for the query image within each of the identified one or more image clusters to identify a respective set of result images on the image cluster's assigned leaf server, wherein the nearest neighbor search is performed according image distance in the hash space.

Other embodiments of this aspect include corresponding systems, apparatus, and computer program products.

These and other embodiments can each optionally include one or more of the following features.

The tree-based representation of the image corpus is one of a K-d tree, a spill-tree, a metric tree, a vantage-point tree, or a hybrid tree.

The tree-based representation is a spill-tree and at least one image in the image corpus is included in more than one of the plurality of image clusters.

Distributing the plurality of image clusters among the plurality of leaf servers further includes distributing the plurality of image clusters among the plurality of leaf servers according to an estimated search volume targeting each image cluster.

At least one leaf server is assigned more than one image cluster or at least one image cluster is replicated on more than one leaf server.

Mapping each image cluster from the multi-dimensional feature space to the hash space further includes, for each image in the image cluster, applying a locality-sensitive hash function to a respective feature vector of the image in the multi-dimensional feature space to obtain the respective hash value of the image in the hash space.

The locality-sensitive hash function is a random projection into the Hamming space, and each hash value is a bit sequence.

The locality-sensitive hash function and the hash space are unique to each image cluster.

The query image and the images in the identified one or more image clusters are each represented by a respective hash value in the hash space. Performing the nearest neighbor search in the hash space further includes: performing a two-stage nearest-neighbor search for the received query image within each of the one or more identified image clusters on the image cluster's assigned leaf server, the first stage of the nearest-neighbor search being performed according distances computed using a proper subset of all bits of the hash values of the query image and each image in the image cluster, and the second stage of the nearest-neighbor search being performed according to distances computed using all bits of the hash values of the query image and each image within a preliminary set of results produced by the first stage.

Searching the tree-based representation on the root server further includes: computing a respective feature vector of the query image in the multi-dimensional feature space; and traversing the tree-based representation using the respective feature vector of the query image to reach one or more leaf nodes of the tree-based representation, the one or more leaf nodes representing the one or more image clusters to which the query image belongs in the multi-dimensional feature space.

Performing the nearest-neighbor search for the query image within each of the identified one or more image clusters further includes the following operations for the image cluster. A hash value for the query image is computed in the hash space. A respective first distance between the query image and each image in the image cluster is computed in the hash space, where the respective first distance is based on a proper subset of all bits of the respective hash values of the query image and the image in the image cluster. A preliminary set of result images are identified based on the respective first distances. A respective second distance between the query image and each image in the preliminary set of result images is computed, where the respective second distance is based on all bits of the respective hash values of the query image and the image in the preliminary set of result images. A final set of result images are identified from the preliminary set of result images based on the respective second distances, where the final set of result images are ranked according to the respective second distances.

The sets of result images identified by the one or more leaf servers are merged at the root server to form a result list responsive to the query image. The merging includes applying a filtering criterion to the sets of result images to remove inappropriate and duplicate images and ranking the remaining result images in the sets of result images according to a measure of quality for each of the remaining result images.

Another aspect of the subject matter described in this specification can be embodied in a system including a root server and a plurality of leaf servers configured to communicate with the root server. The root server includes a tree-based representation for an image corpus in a multi-dimensional feature space, the tree-based representation includes a root-node and a plurality of leaf nodes, the root node represents all images in the image corpus, and each leaf node represents a respective image cluster in the image corpus. Each leaf server is assigned at least one image cluster in the image corpus and has access to a respective hash value for each image in the leaf server's assigned image clusters. The root server is operable for performing operations including: searching the tree-based representation to identify one or more image clusters to which a received query image belongs in the multi-dimensional feature space and forwarding the query image to one or more leaf servers that have been assigned the identified one or more image clusters. Each leaf server is operable for performing operations including: for each identified image cluster assigned to the leaf server, performing a two-stage nearest-neighbor search for the received query image within the identified image cluster to identify a set of result images. The first stage of the nearest-neighbor search is performed according distances computed using a proper subset of all bits of the hash values of the query image and each image in the image cluster, and the second stage of the nearest-neighbor search is performed according to distances computed using all bits of the hash values of the query image and each image within a preliminary set of results produced by the first stage. Other embodiments of this aspect include corresponding apparatus, and computer program products.

Another aspect of the subject matter described in this specification can be embodied in a system including a root server and a plurality of leaf servers configured to communicate with the root server. The root server is operable for performing operations including: generating a tree-based representation of an image corpus, the tree-based representation including a plurality of leaf nodes, each leaf node representing one of a plurality of image clusters in the image corpus in a multi-dimensional feature space; distributing the plurality of image clusters among the plurality of leaf servers, such that each image cluster is assigned to a leaf server in the plurality of leaf servers; searching the tree-based representation to identify one or more image clusters to which a received query image belongs in the multi-dimensional feature space; and forwarding the received query image to one or more leaf servers that have been assigned the identified one or more image clusters. Each of the plurality of leaf server is operable for performing operations including: mapping each image cluster assigned to the leaf server from the multi-dimensional feature space to a hash space such that each image in the image cluster is represented by a respective hash value in the hash space; and for each identified image cluster assigned to the leaf server, performing a nearest-neighbor search for the query image within the image cluster to identify a respective set of result images, wherein the nearest neighbor search is performed according image distance in the hash space. Other embodiments of this aspect include corresponding apparatus, and computer program products.

These and other embodiments can each optionally include one or more of the following features.

Distributing the plurality of image clusters among the plurality of leaf servers further includes, distributing the plurality of image clusters among the plurality of leaf servers according to an estimated search volume targeting each image cluster.

At least one leaf server is assigned more than one image cluster or at least one image cluster is replicated on more than one leaf server.

Mapping each image cluster from the multi-dimensional feature space to the hash space further includes: for each image in the image cluster, applying a locality-sensitive hash function to a respective feature vector of the image in the multi-dimensional feature space to obtain the respective hash value of the image in the hash space.

The locality-sensitive hash function is a random projection into the Hamming space, and each hash value is a bit sequence.

Searching the tree-based representation further includes, computing a respective feature vector of the query image in the multi-dimensional feature space and traversing the tree-based representation using the respective feature vector of the query image to reach one or more leaf nodes of the tree-based representation, the one or more leaf nodes representing the one or more image clusters to which the query image belongs in the multi-dimensional feature space.

Performing the nearest-neighbor search for the query image within the image cluster to identify a respective set of result images further includes the following operations: computing a hash value for the received query image in the hash space; computing a respective first distance between the received query image and each image in the image cluster in the hash space, the respective first distance being based on a proper subset of all bits of the respective hash values of the query image and the image in the image cluster; identifying a preliminary set of result images based on the respective first distances; computing a respective second distance between the received query image and each image in the preliminary set of result images, the respective second distance being based on all bits of the respective hash values of the received query image and the image in the preliminary set of result images; and identifying a final set of result images from the preliminary set of result images based on the respective second distances, the final set of result images being ranked according to the respective second distances.

The root server is further operable for performing operations including: merging the sets of result images identified by the one or more leaf servers to form a result list responsive to the query image. The merging includes applying one or more filtering criteria to the sets of result images to remove inappropriate and duplicate images and ranking the remaining result images in the sets of result images according to a measure of quality for each of the remaining result images.

Particular embodiments of the subject matter described in this specification are implemented to realize one or more of the following advantages.

In some implementations, a distributed image retrieval system includes a root server and a plurality of leaf servers. The root server controls the clustering of images in the image corpus, and determines the assignment of image clusters to a collection of leaf servers. Each leaf server is independently configured to perform a nearest-neighbor search for a received query image within the leaf server's assigned images clusters. Thus, the distributed image retrieval system is modular and amendable to tuning, modifications, duplication, and replacement on a per-server basis.

For example, when the root server changes its clustering algorithm or the assignment of the image clusters to leaf servers, no significant changes need to be made to the processes implemented on the leaf servers. Each leaf server can independently change its nearest-neighbor search method or nearest-neighbor search thresholds based on the particular characteristics of the leaf server's assigned image clusters, without affecting the operations of the root server or other leaf servers. Thus, each part of the entire root-leaf system can be fine tuned over-time after the whole image retrieval system is set up and in operation.

In addition, the design of the image retrieval system allows flexible load balancing among the leaf servers. When dividing the image corpus into image clusters of various sizes and assigning the images clusters to leaf servers, the search volume targeting each image cluster, cluster sizes, and resources available on each leaf server are optionally taken into consideration to create a load-balanced system. Subsequently, the root server can combine or further divide particular image clusters depending on the actual search volumes targeting those particular image clusters. In addition, the root server can replicate particular image clusters and assign them to multiple leaf servers, such that no particular leaf server is overloaded with too many image queries within the leaf server's assigned image clusters. In some implementations, the root server is also replicated to further divide search load and improve search response time.

In some implementations, the leaf servers implement a two-stage nearest-neighbor search in a locality-sensitive hash space (e.g., the Hamming spacing). The mapping from the multi-dimensional feature space to the hash space reduces the memory usage and computation time. The nearest-neighbor search in the hash space is fast and efficient, but includes errors due to the reduction in dimensionality. This mapping from the multi-dimensional feature space to the hash space is only applied at the leaf-level, such that the errors induced by this approximation are confined to the leaf-level.

During the first stage of the two-stage nearest-neighbor search, only a proper subset of all bits of the full hash values (e.g., first n bits of each hash value, n being less than the full hash length) is used to compute the distance between the query image and each image in the image cluster in the hash space. This computation is faster compared to the computation using the full hash values. After a preliminary set of result images is identified, the image distance between the query image and each preliminary result image is recomputed using their full hash values (e.g., all bits of each hash value), and top-ranked result images in the preliminary set are identified based on the distances calculated using the full hash values. By using the two-stage nearest-neighbor search, speed and memory usage efficiency is improved compared to a one-stage nearest-neighbor search using the full hash values for all images in the image cluster.

The details of one or more embodiments of the subject matter that are described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
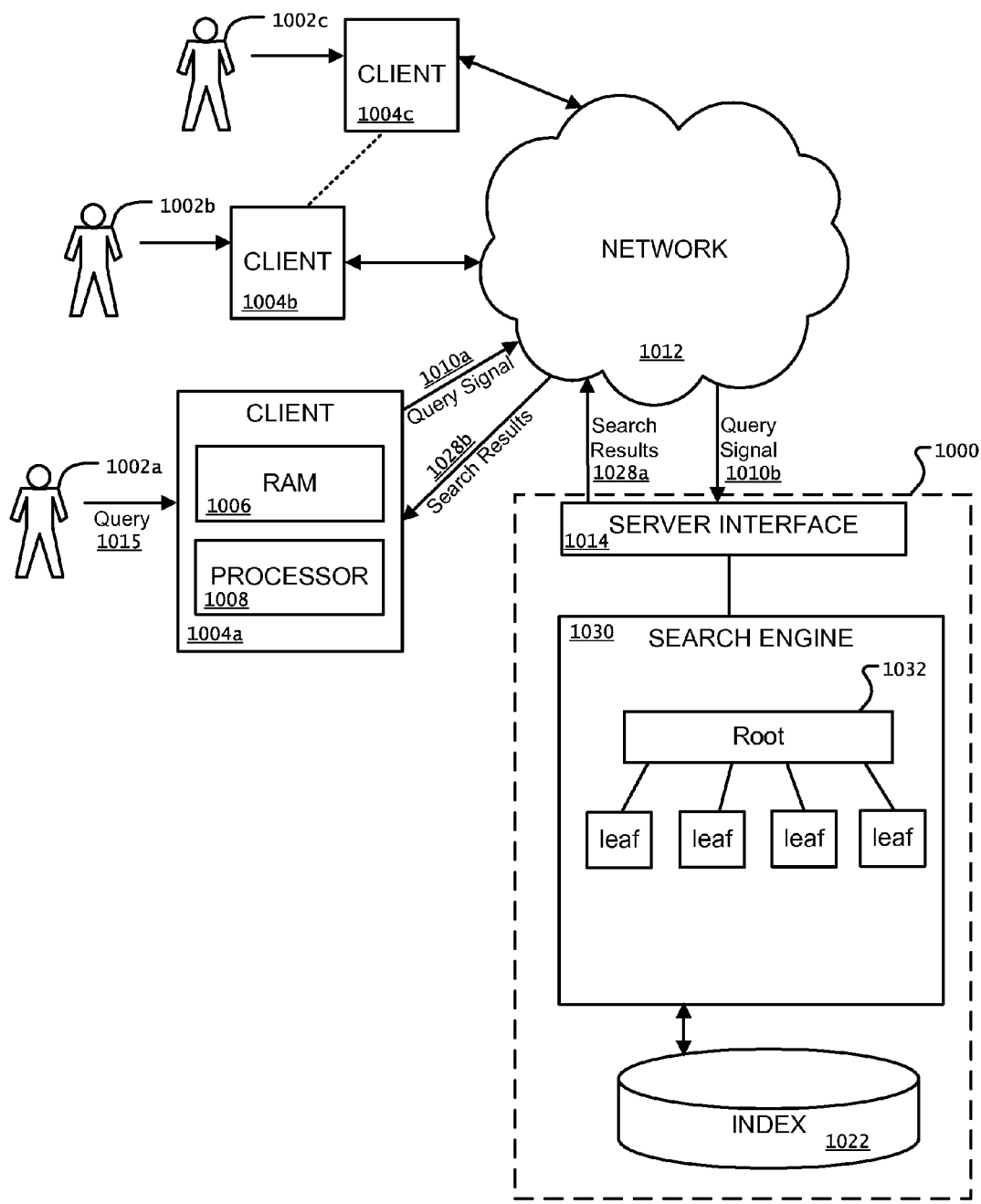
FIG. 1 shows an example information retrieval system.

FIG. 1 shows an example information retrieval system 1000. The information retrieval system 1000 can be implemented in an internet, intranet, or other client/server environment for retrieving relevant results in response to search queries submitted by users. The information retrieval system 1000 is an example system in which the systems, components, and techniques described in this specification can be implemented. Although several components are illustrated, there may be fewer or more components in the system 1000. Moreover, as illustrated in this specification, the components can be distributed on one or more computing devices connected by one or more networks or other suitable communication medium.

In the example system 1000, a user 1002 (e.g., 1002*a*, 1002*b*, and 1002*c*) interacts with the system 1000 through a client device 1004 (e.g., 1004*a*, 1004*b*, and 1004*c*) or other device. The client device 1004 is, for example, a computer terminal within a local area network (LAN) or wide area network (WAN). The client device 1004 includes a random access memory (RAM) 1006 (or other memory and/or a storage device) and a processor 1008. The processor 1008 is structured to process instructions within the device 1004. The processor 1008 is a single-threaded or multi-threaded processor having one or more processor cores, for example. In some implementations, the processor 1008 is structured to process instructions stored in the RAM 1006 (or other memory and/or a storage device included with the client device 1004) to display graphical information for a user interface.

A user 1002*a* connects to the search engine 1030 through a server system interface 1014 to submit a query 1015, for example, in the form of a query image. The query image can be selected from a storage device coupled to the client device, from a list presented by the server interface, or from a third party server interface. The query image may be in various formats, such as JPEG, bitmap, JIFF, and so on. The server system interface 1014 is one or more components or machines configured to receive queries from client devices 1002 according to various communication protocols (e.g., HTTP, etc.). When the user 1002*a* submits the query 1015 through an input device attached to the client device 1004*a*, a client-side query signal 1010*a* is sent into a network 1012 and is forwarded to the server system interface 1014 as a server-side query signal 1010*b*. The server system interface 1014 resides on one or more server devices in one or more locations. The server system interface 1014 transmits, and the search engine 1030 receives the server-side query signal 1010*b*. The search engine 1030 uses the information within the query 1015 (e.g. the query image) to find relevant documents (e.g., similar images) within one or more document corpora (e.g., e.g., one or more image databases).

In some implementations, the search engine 1030 enables image-based search queries. The search engine 1030 includes components for indexing an image corpus, searching within the image corpus for relevant images, and ranking the relevant images responsive to each received query image. The search engine 1030 optionally crawls the Web to find new images to add to the image corpus, and stores the images within a searchable index 1022. The search for relevant images (e.g., similar images to a received query image) and the ranking of the relevant images are performed based on a combination of factors, such as the similarity between the query image and the relevant images in terms of a number of selected image features, the relative quality of the images, user-feedback toward the images in previous searches, and so on. Each factor may be evaluated using one or more appropriate techniques. Each factor is used either for direct ranking of the relevant images or for modifying the ranking of particular result images in a result list.

The search engine 1030 forwards the final, ranked result list within a server-side search result signal 1028a through the network 1012. Exiting the network 1012, a client-side search result signal 1028b is received by the client device 1004a where the results are stored within the RAM 1006 and/or used by the processor 1008 to display the results on an output device for the user 1002a.

The search engine 1030 includes server components and machines responsible for the indexing, searching, result ranking, and result presentation processes performed on the search engine 1030. A server component or machine includes a memory device that includes instructions for carrying out the functionalities of the server component or machine within the search engine 1030. The server component or machine also includes one or more processors (e.g., a single-threaded or multi-threaded processor having one or more processing cores). The processor 1018 processes instructions related to the search engine functionalities stored in the memory, such as searching the index for similar images of a query image, merging results from multiple subsidiary servers, creating a search results webpage displayed in a web browser, sending information to the client device 1004, and so on.

In some implementations, the image search engine 1030 includes a distributed image retrieval system 1032. The distributed image retrieval system 1032 includes multiple servers sharing the image query load received by the server system interface 1014. In addition, for a large image corpus, the distributed image retrieval system 1032 divides the image corpus into smaller segments, and allows multiple severs to process the same query within multiple segments in parallel. The search results obtained by each server are then merged by the distributed image retrieval system 1032 to produce a single integrated result list.

Figure 2:
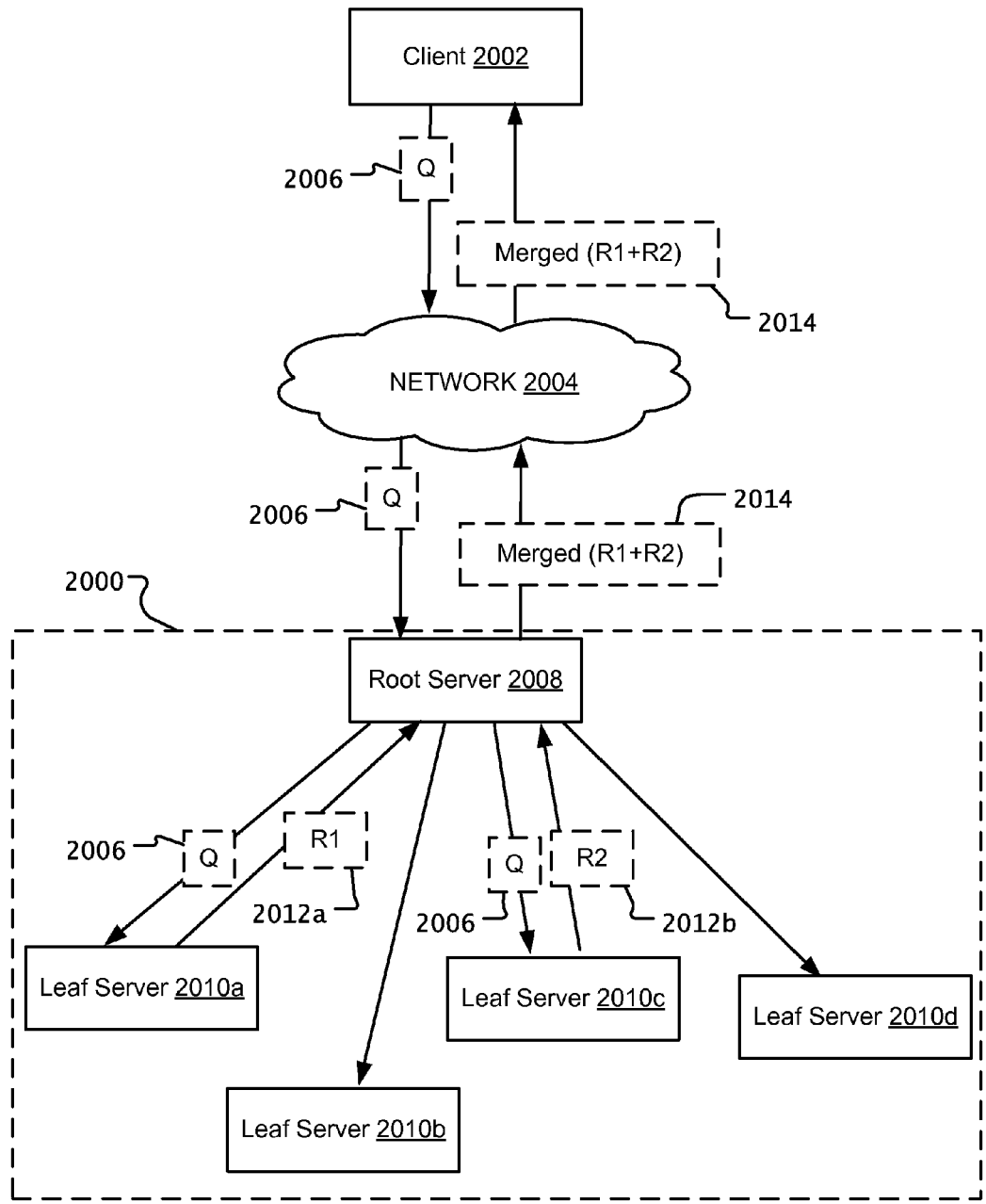
FIG. 2 shows an example distributed image retrieval system.

FIG. 2 illustrates an example distributed image retrieval system 2000. The distributed image retrieval system 2000 includes a root server 2008, and multiple leaf servers 2010 (e.g., leaf servers 2010a, 2010b, 2010c, and 2010d) configured to communicate with the root server through one or more communication networks 2004. Each of the root server 2008 and leaf servers 2010 is implemented on one or more components or machines.

When a query 2006 (e.g., in the form of an query image) is received from a client device 2002 through one or more networks 2004, the root server 2008 determines which leaf servers are appropriate for handling the search for result documents (e.g., similar images) responsive to the query 2006. The root server 2008 selects the appropriate leaf servers according to various factors and considerations, such as the current load on the image retrieval system 2000, available resources on the leaf servers 2010, search speed requirements, locations of the leaf servers, and so on. In some cases, if the document corpus is divided among multiple leaf servers, the root server 2008 also takes into account the relative likelihood of each segment of the corpus containing relevant documents responsive to the query 2006. The root server 2008 thus selects only particular leaf servers to search within particular segments of the corpus that have a high likelihood of containing relevant documents.

Once the root server 2008 identifies the suitable leaf servers (e.g., leaf servers 2010a and 2010c) for the query 2006, the query 2006 is forwarded to the identified leaf servers (e.g., leaf server 2010a and 2010c). In some implementations, the query 2006 is normalized or transformed into a standard format before the search is performed by the leaf servers. The normalization and transformation is optionally performed by the root server 2008, the leaf servers 2010, or another component of the distributed image retrieval system 2000.

After receiving the query 2006, each leaf server (e.g., 2010a and 2010c) then performs the search within the document corpus or a segment of the document corpus that is assigned to the leaf server. The search processes on each leaf server (e.g., 2010a or 2010c) are carried out in parallel, and a list of result images along with relevant ranking information for the result images (e.g., 2012a and 2012b) is sent from each leaf server (e.g., 2010a and 2010c) performing the search to the root server 2008.

After the root server 2008 receives the multiple lists of result images from the leaf servers (e.g., 2010a and 2010c), the root server 2008 integrates the multiple lists of result images into a single result list 2014. The root server 2008 ranks the result images according to the ranking information sent along with the result lists, and other information available to the root server 2008. For example, each leaf server provides query-dependent information along with the result images, such as a similarity score based on a measure of similarity between the query image and each result image in terms of one or more image features. The root server 2008 optionally accesses certain query-independent information that affects the ranking of the result images. Examples of the query independent information include, for example, a quality score for each result image, historic user-feedback data for each result image, presence of duplicates in the result lists, various filtering criteria (e.g., filters for pornographic or other types of inappropriate images), and so on. In some implementations, the root server 2008 merges and ranks the results based on the query independent information and the query independent information. In some implementations, the root server 2008 receives ranked result lists, and adjusts the ranking of particular results based on the query-independent information.

The root server 2008 then sends the merged result list 2014 to the client 2002 through the one or more networks 2004. The merged result list 2014 is presented on a client device as a formatted result webpage, for example. The result webpage includes, for example, links and/or thumbnails of the result images that have been identified by the image retrieval system 2000 as being most similar to the query image.

A distributed image retrieval system (e.g., the image retrieval system 2000) has the advantages of being capable of handling a large document corpus and high search volumes, because multiple searches on multiple segments of the document corpus can be performed in parallel. However, because a distributed image retrieval system involves many components or machines working together, load balancing and fault tolerance are important factors to consider when designing the distributed image retrieval system.

In addition, many changes can take place after a distributed image retrieval system is set up and in operation, and a well-designed distributed image retrieval system should be amendable to these changes. For example, the image corpus may grow or reduce in size and content over time, better processes may be developed for individual pieces of equipment or components, search volumes targeting particular locations or corpus segments may change, and so on. Therefore, it is desirable to have a modular and flexible system such that each piece of the system can be tuned, upgraded, replaced, removed, or duplicated without significant disruption to the operations of other system components or the system as a whole.

Figure 3:
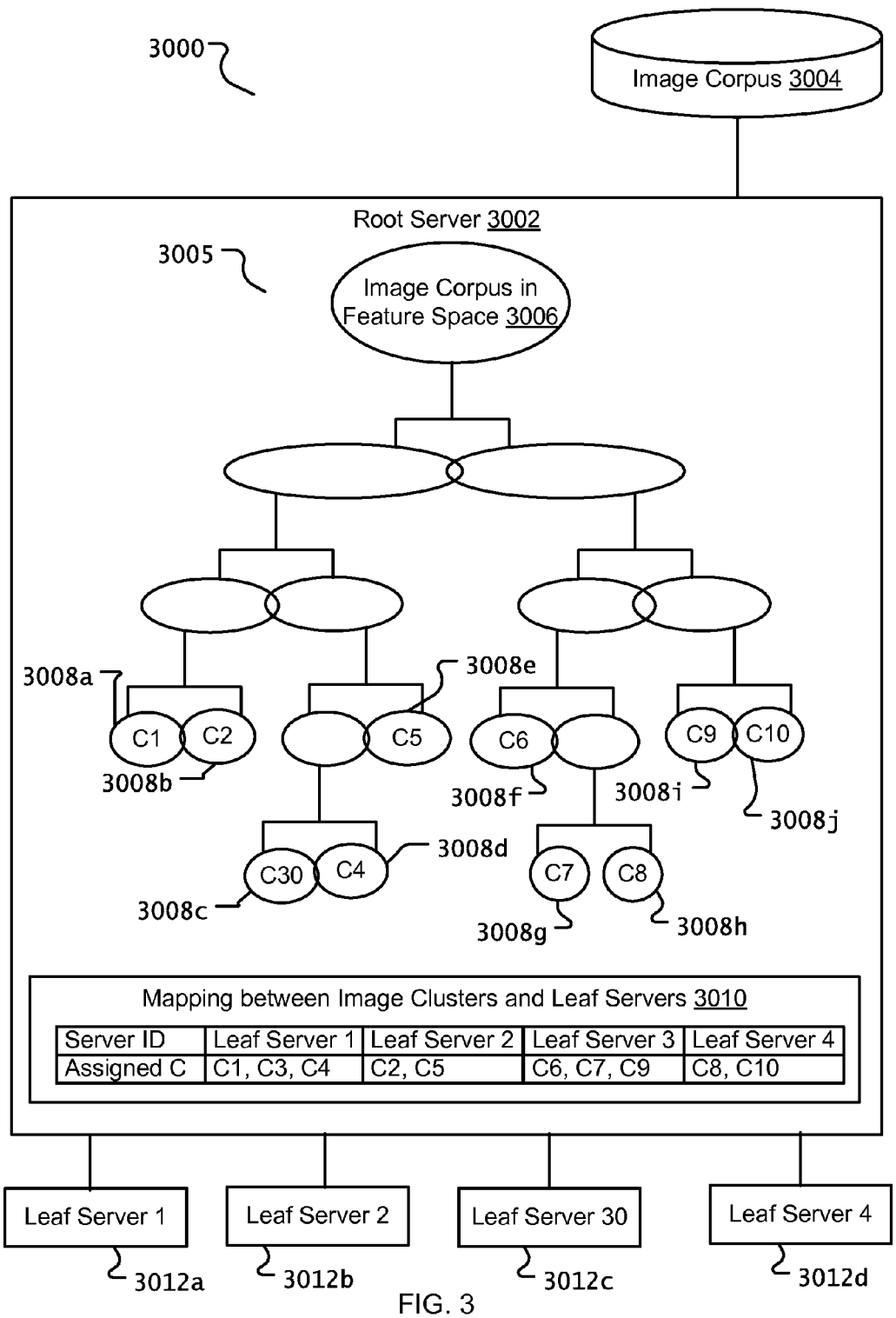
FIG. 3 illustrates an example root server in the example distributed image retrieval system.

FIG. 3 illustrates an example distributed image retrieval system 3000. The example image retrieval system 3000 includes a root server 3002 and multiple leaf servers 3012 (e.g., leaf severs 3012a-3012d) configured to communicate with the root server 3002. The design of the distributed image retrieval system 3000 is modular and exhibits some desirable attributes, such as easy load balancing, scalability, fault tolerance, and so on.

The example distributed image retrieval system 3000 is configured to work on an image corpus 3004. The image corpus 3004 is a collection of images within which relevant result images that are responsive to an image query (e.g., in the form of a query image) can be searched and identified. In some implementations, an image corpus includes one or more image databases or indices accessible to the distributed image retrieval system 3000. The one or more image databases or indices include, for example, street panoramas, aerial photos, images retrieved from the Web, advertisement images, digital photos submitted by individuals, bar codes, trademarks, labels, and so on. The same image corpus may be indexed by text-annotations, and made available for text-based searches queries as well. The size of the image corpus may grow or reduce over time. For example, the image retrieval system may include a crawler that actively crawls the Web to discover new images and enriching the image corpus. At the same time, the image retrieval system may also remove images from the image corpus that are duplicates or inappropriate as result images for searches.

When preparing the image corpus for image-based searches, an abstraction of the images is performed to transform the images into corresponding feature vectors in an image feature space. The image feature space includes one or more dimensions, each dimension being defined by a respective image feature. A multi-dimensional feature space is defined if multiple image features are used to characterize each image in the image corpus. Image features that are of interest in the search for similar images include, for example, color, spatial-color distribution, shape, size, texture, spatial frequency, intensity, spatial-intensity distribution, and so on. Image features used to define a feature space are selected based on human perception of similarities between images, for example. Other relevant features can be defined depending on the particular purposes for the image searches (e.g., identifying particular objects or subject matter in the images, etc.).

After being transformed into a multi-dimensional feature space, each image in the image corpus is represented by a mathematical point or a feature vector in the multi-dimensional feature space. Consequently, the entire image corpus is represented as a collection of points in the multi-dimensional feature space, each point representing an image in the image corpus. The coordinates of a point (or alternatively, the components of a feature vector) in the multi-dimensional feature space are values that characterize a corresponding image in the multiple dimensions of the multi-dimensional feature space. By transforming the images in the image corpus into the feature space, the information contained in each image is greatly compressed, and a single or a small number of machines would be able to hold the feature vectors (or points) of the entire image corpus. An index is created that maps the image corpus from the image space to the multi-dimensional feature space, and vice versa. The index is optionally stored on the root server 3002 or is accessible to the root server 3002.

In the example distributed image retrieval system 3000, the root server 3002 stores a tree-based representation of the image corpus 3004 in the multi-dimensional feature space. The tree-based representation includes a root node 3006 and a plurality of leaf nodes 3008. The root node 3006 represents the image corpus in the multi-dimensional feature space. Each leaf node (e.g., 3008a-3008j) represents an image cluster within the image corpus.

The root server 3002 is capable of implementing various clustering algorithms to partition the image corpus 3004 into image clusters in the multi-dimensional feature space, where each image cluster includes images that are similar to one another in terms of the distances between their feature vectors. Clustering divides a large image corpus into smaller sub-corpora, such that searches may be performed in a subset of the sub-corpora that are more likely to produce relevant results for a given query. Therefore, in particular implementations, the root server 3002 may include a non-tree-based representation of the image corpus in the multiple-dimensional feature space.

Examples of approaches for clustering images include tree-based clustering, and locality-sensitive-hash-based (LSH-based) clustering.

In a tree-based clustering algorithm, a tree-based representation of the image corpus is generated. The points representing the images in the image corpus are organized in a hierarchical structure (i.e., the tree). Each node of the tree represents a set of points. The root node represents all points in the image corpus, and each leaf node represents an image cluster within the image corpus. When building the tree, the points represented by an internal node V are partitioned into two subsets, each subset being represented the two children of the internal node V. A partition criterion determines how the nodes on each level of the tree are divided into their children.

Typically, to divide a node, two pivot points are chosen from the points N(V) in the node V. Ideally, the pivot points are chosen such that the distance between them is the largest among all pair distances within the node V. In some implementations, the requirement for the pivot points are relaxed, and two points with a relatively large distance are used. A partition boundary (e.g., the median plane) is found between the two pivot points, dividing the node into two partitions. Each partition becomes a child node of the node V. Depending on the particular ways for selecting the pivot points and partition boundary, different tree-based representations will result. Common tree-based representations include, for example, a metric tree, a vantage point tree, a K-d tree, a spill-tree, and so on. In some implementations, different methods for selecting the pivot points and partition boundary are used for different nodes within the tree, resulting in a hybrid tree.

A LSH-based clustering method is based on a particular type of hash functions, the so-called locality-sensitive hash functions. A LSH function is able to map points from a multi-dimensional feature space to a hash space, such that if the two points are close in the multi-dimensional feature space, the two points in the hash space have a high probability of being close to each other as well. Therefore, by applying a locality-sensitive hash function to a collection of points in the multi-dimensional feature space, if two points from the multi-dimensional feature hash into the same bucket in the hash space, they are assigned to the same cluster. LSH-based clustering carries errors caused by the dimension-reduction resulted from the hashing.

In this particular example, the root server 3002 implements a spill-tree (e.g., a spill-ball-tree in the multi-dimensional feature space). A spill-tree is a variant of a metric tree where the children of a node can "spill over" onto each other, and contain shared points. The partition procedure of a metric tree implies that point sets of the two child nodes of a common parent are disjoint, i.e., these two sets are separated by a single decision boundary L. In a spill-tree, however, the partition criteria allow an overlap buffer between two child nodes. In other words, a point may belong to both children of a parent node.

When building a spill-tree representation of an image corpus, like in building a metric tree, two pivot points are chosen, and a decision boundary L is defined based on the two pivot points. Next, two separating surfaces LR and LL are defined, both of which are parallel to the decision boundary L and are at a distance t away from the decision boundary L. All the points to the right of the left plane LL belong to the right child node, and all the points to the left of the right plane LR belong to the left child node. The points that fall in the regions between the left (LL) and the right (LR) planes are shared by the left and the right child nodes. This overlapping region is defined by the size of the overlapping distance t. The partition procedure is repeated until a stopping threshold is met. The stopping threshold is based on, for example, a desired cluster size that would fit within one leaf server, an estimated search volume for a cluster would not exceed a particular value, or a combination of the two.

Based on the partition criteria and the overlapping size t of the spill-tree, the root node is divided into overlapping child nodes, and each internal node is further divided into overlapping lower-level child nodes, until the process ends when the stopping threshold is met. The resulting spill-tree 3005 includes a root node 3006 that represent all the points in the image corpus in the multi-dimensional feature space, and the each leaf node 3008 represents all the points within a respective image cluster in the image corpus. Since overlap between nodes is allowed, two image clusters may include shared images within the overlapping region. The different overlapping size t is optionally specified for each level of the spill-tree, such that the number of points in the overlapping region does not exceed a particular threshold number.

By using a spill-tree to represent the image corpus, a defeatist search method can be used to traverse the tree, i.e., descending the tree using the partition boundary L at each level without backtracking until a leaf node is reached. The overlapping region reduces the error caused by the lack of backtracking, because the probability of descending the wrong path is greatly reduced.

Once the tree-based representation of the image corpus in the multi-dimensional feature space is created, the root server 3002 distributes the collection of image clusters 3008 among a number of leaf servers 3012. In some implementations, each image cluster is uniquely assigned to a single leaf server. Alternatively, several image clusters are assigned to the same leaf server. A mapping 3010 between the image clusters and the leaf servers is operationally stored on the root server 3002, or at another location accessible to the root server 3002. In this example, as illustrated in FIG. 3, the image corpus is divided into ten image clusters (e.g., 3008a-3008j), and some of these image clusters overlap to varying degrees. In some implementations, where non-tree-based clustering algorithms are implemented in the root server, the assignment of resulting image clusters to leaf servers described herein also applies.

In this illustrative example, the root server 3002 assigns the ten image clusters (e.g., 3008a-3008j) to four leaf servers (e.g., 3012a-3012d), taking into consideration of cluster sizes, estimated search volume targeting each cluster, available resources on each leaf server, location of the leaf server relative to the root server, and so on. For example, multiple small image clusters are optionally assigned to a single leaf server, while a large image cluster is optionally assigned to a single leaf server. In some implementations, for an image cluster that are targeted with a high frequency, the image cluster is duplicated on multiple leaf servers, and the root server selectively distributes the search load for that image cluster on the multiple leaf servers. In some implementations, if the root server determines that a particular image cluster is targeted at a high frequency, the root server may subsequently further divide the leaf node for that cluster to smaller clusters, and reassign the resulting clusters to existing or new leaf servers. In some implementations, the root server combines image clusters into its parent node, if the search volume for the image clusters is not sufficiently high.

The flexibility in having image clusters of different sizes and assigning different number of clusters to different leaf computers allows the root server 3002 to manage the load on each leaf computer, so that the entire distributed image retrieval system 3000 is load-balanced. Furthermore, it is easy to split clusters, combine clusters, redistribute clusters among leaf servers, or duplicate clusters on multiple leaf servers after the system has been implemented and in operation, because the amount of time and resources needed to regenerate the tree-based representation is small. In addition, it is easy to modify, remove, replace, or duplicate the root server or any leaf server without significant disruption to the operation of the entire system, so the entire system is also scalable, robust, and fault tolerant.

In this particular example, the mapping 3010 between image clusters and leaf servers are stored as a table accessible to the root server 3002. The table is indexed by leaf server ID, or by cluster ID, or both. Using the table, it is easy to determine which leaf servers have been assigned a given image cluster, and which image clusters have been assigned to a given leaf server. In this illustrative example, leaf server 1 is assigned image clusters C1, C3, and C4; leaf server 2 is assigned image clusters C2 and C5; leaf server 3 is assigned image clusters C6, C7, and C9; and leaf server 4 is assigned image clusters C8 and C10. In other words, clusters C1, C3, and C4 are assigned to leaf server 1; clusters C2 and C5 are assigned to leaf server 2, clusters C6, C7, and C9 are assigned to leaf server 3, and clusters C8 and C10 are assigned to leaf server 4. The root server 3002 uses the mapping 3010 to decide which leaf servers to forward a query image to, once the root server 3002 has decided to which image clusters the query image belongs in the multi-dimensional feature space.

Each leaf server operates in parallel and independently of one another, so there is great flexibility in replacing, duplicating, and/or modifying individual leaf servers without affecting the operation of other leaf servers. Each leaf server optionally implements a unique nearest-neighbor search method to find the similar images responsive to a query image, or have different search thresholds or ranking factors for the identified result images, depending on the characteristics of the leaf server's particular assigned image clusters.

Figure 4:
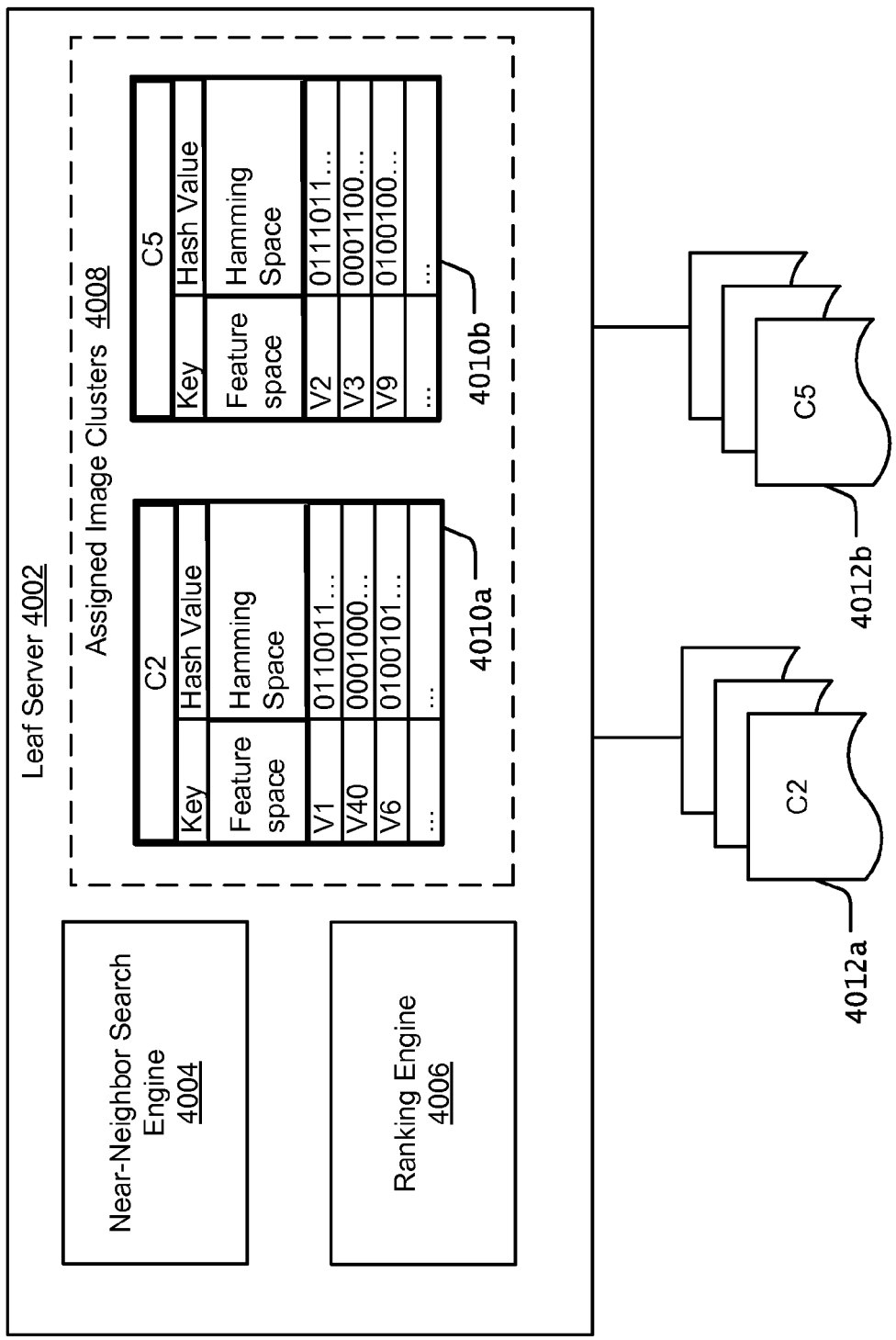
FIG. 4 illustrates an example leaf server in the example distributed image retrieval system of FIG. 3.

FIG. 4 illustrates an example leaf server 4002 for the example distributed image retrieval system of FIG. 3. The example leaf server 4002 implements an approximate nearest-neighbor search method in a hash space. In some implementations, other approximate or exact nearest-neighbor search methods, such as tree-based nearest-neighbor search methods are implemented within some of the leaf servers of the example distributed image retrieval system.

Continue with the illustrative example in FIG. 3, leaf server 2 (3012b in FIG. 3 and 4002 in FIG. 4) has been assigned image cluster C2 (4012a) and image cluster C5 (4012b). In some implementations, leaf server 2 (4002) is notified of the assignment and given access to the assigned image clusters in the multi-dimensional feature space. In some implementations, the leaf server does not have access to the actual images in the image corpus and only operates on the image vectors in the multi-dimensional feature space. In some implementations, the leaf server 4002 or another component of the image retrieval system 3000 maps each feature vector in the leaf server's assigned image clusters 4012 (e.g., 4012a and 4012b) into a hash space by applying a locality-sensitive hash function to the image vectors. The approximate nearest-neighbor search is then performed in the hash space on the leaf server 4002.

A locality-sensitive hash function has the property that when the hash function is applied to images in the multi-dimensional feature space, the relative distances between the hash-values of the images in the hash space have a high probability of resembling the relative distances between the hash values' corresponding image vectors in the multi-dimensional feature space. Therefore, the locality-sensitive hash space approximates the multi-dimensional feature space for computing the similarity between images. The transformation from the multi-dimensional feature space to the hash space greatly reduces the storage and computation time needed to identify approximate nearest neighbors of a query image.

An example locality-sensitive hash function is the random projection into the Hamming space. The Hamming space of dimension N is the set of all $2^N$ binary strings of length N. The appropriate size (N) for the Hamming space is optionally specified based on the available memory of the leaf server 4002. When the random projection into the Hamming space is applied to an image vector in the multi-dimensional feature space, the resulting hash value is a binary string of length N.

The distance between images in the Hamming space is defined as the distance between the two binary strings a and b corresponding to the images, which is equal to the number of is in a XOR b. In general, the Hamming distance between two strings of equal length is the number of positions at which the corresponding symbols are different. In other words, the Hamming distance measures the minimum number of substitutions required to change one string into the other.

By comparing the Hamming distances between the query image and each image in the image cluster, a list of top-ranked images can be identified, the smaller the distance, the higher the rank (i.e., similarity). The size or dimensionality of the Hamming space affects the accuracy of the nearest neighbor search in the Hamming space, the larger the size, the more accurate the nearest-neighbor search. To further improve accuracy, random concatenation of multiple locality-sensitive functions is optionally used to map the image vectors to the hash space. However, the memory and processing resources needed to store the hash values and compute the distances are correspondingly increased.

In this illustrative example, the assigned clusters 4008 are stored as key-value pairs in hash tables on the leaf server 4002. Each image in each cluster is mapped from the feature space to the hash space, and stored on the leaf server (e.g., as key-value pairs in a corresponding hash table). For example, cluster C2 is stored in a hash table 4010a and cluster C5 is stored in a different hash table 4010b. A different locality-sensitive hash function is used for the mapping each image cluster from the image feature space to the hash space.

In addition to having access to the hash values of images in the hash space, the leaf server 4002 also includes a nearest-neighbor search engine 4004. The nearest-neighbor search engine 4004 implements an approximate nearest search method, such as that based on the distances between a query image and images in the leaf server's image cluster. An example two-stage nearest neighbor search in a locality-sensitive hash space is described with respect to FIG. 6.

The leaf server 4002 optionally includes a ranking engine 4006 that provides preliminary ranking for the identified nearest neighbors of the query image in the leaf server's assigned clusters. The preliminary ranking is based on the relative distances between the query image and the identified nearest neighbors in the hash space. Other factors are optionally taken into consideration in the ranking. For example, duplicate images may be removed or demoted from the result list, and the ranking can also be based on the quality of the result images. The quality of the images is measured by a number of factors, such as the sources of the images, the size of the images, user-feedback about the images, or other information that the leaf server has about the images. Alternatively, the ranking is based strictly on the relative distances in the hash space at the leaf-level, and adjustments of the ranking are performed by the root server when results from multiple leaf servers are merging to create an integrated result list.

Figure 5:
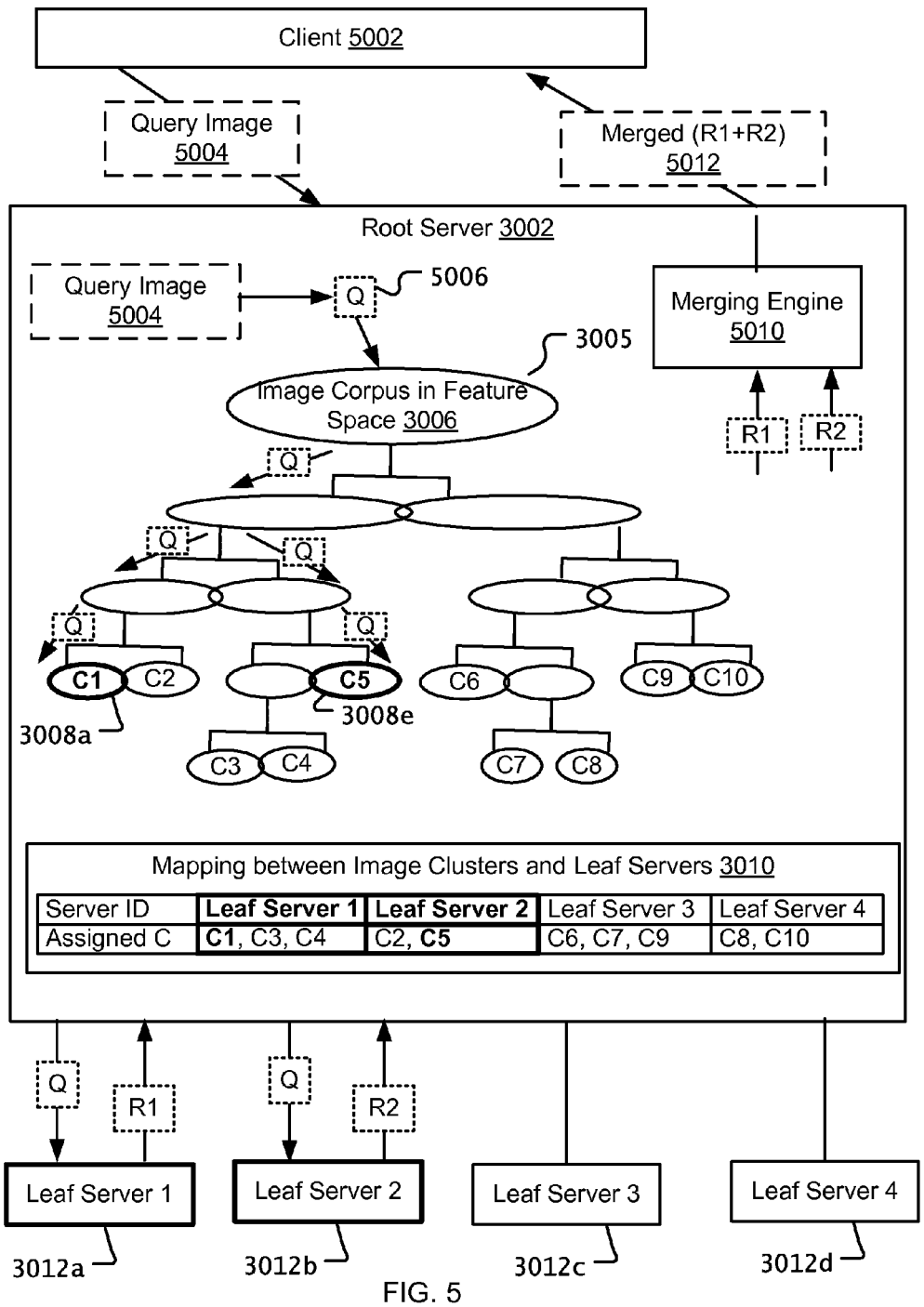
FIG. 5 illustrates the processing of an image query through the example distributed image retrieval system of FIG. 3.

FIG. 5 illustrates the processing of an image query through the example distributed image retrieval system of FIG. 3. In the example, a client device 5002 submits a query image 5004 to the root server 3002. The query image 5004 is, for example, a digital photo, an image of an object, a logo, a label, etc. In some implementations, the query image 5004 is first normalized or preprocessed to conform to a standard format, e.g., size, resolution, etc. Once the root server receives the query image 5004, the root server 3002 computes a feature vector 5006 for the query image in a multi-dimensional feature space. The features used to define the dimensions of the multi-dimensional feature space include, for example, color, texture, spatial-color distribution, intensity, spatial-intensity distribution, shape, size, and so on. The same feature space is used for the entire image corpus stored on or accessible to the root server 3002.

After the root server 3002 obtains the feature vector 5006 for the query image 5004, the root server 3002 searches the tree-based representation 3005 to determine which leaf nodes the query image 5004 (or feature vector 5006) belongs to in the multi-dimensional feature space. The root server 3002 begins the search with the root node 3006, the root node 3006 representing the image corpus in the multi-dimensional feature space. As the root server traverses down the tree-based representation 3005, at each node, the root server compares the query image to the decision boundary L of the node, and determines whether the query image belongs to the left child node or the right child node of the current node. In some implementations, the tree-based representation is a spill-tree, and there may be an overlapping region between the two child nodes of common parent node. If the query image falls within the overlapping region, then the query image is determined to belong to both the left and the right child nodes. If that is the case, the root server continues to traverse down both branches of the parent node. Eventually, the query image reaches one or more leaf nodes (e.g., nodes C1 and C5) of the tree-based representation 3005. These leaf nodes represent the image clusters to which the query image belongs in the multi-dimensional feature space and that are most likely to contain the nearest neighbors of the query image in the feature space.

In this particular example, the root server 3002 traverses the tree-based representation 3005, and determines that the query image 5006 belongs to two leaf nodes of the tree, C1 and C5 (3008a and 3008e). The two leaf nodes C1 and C5 represent two image clusters in the multi-dimensional feature space to which the query image belongs.

Once the root server has identified the leaf nodes and hence the image clusters to which the query image belongs in the multi-dimensional feature space, the root server 3002 consults the mapping 3010 between image clusters and leaf servers to determine to which leaf servers the image query should be forwarded. In this case, the mapping 3010 between image clusters and leaf servers indicates that leaf server 1 has been assigned to handle the search within the image cluster C1, and leaf server 2 has been assigned to handle the search within the image cluster C5.

The root server forwards the feature vector 5006 of the query image 5004 to the identified leaf servers 3012a and 3012b. Each leaf server (3012a or 3012b) receives the feature vector 5006 of the query image 5004 and performs a nearest-neighbor search within the leaf server's assigned image clusters to which the query image belongs. An example process for a two-stage approximate nearest-neighbor search in the hash space is described with respect to FIG. 6. Other implementations of the nearest-neighbor search are possible. Each leaf server optionally implements one or more different nearest-neighbor search method depending on the particular characteristics of the leaf server's assigned image cluster(s).

The leaf servers each identify a number of nearest neighbors of the query image within the leaf server's assigned image cluster to which the query image belongs. The nearest-neighbors can be ranked according to the closeness between the query image and the images in the image cluster as determined by the leaf server's ranking engine. In some implementations, the leaf server simply returns a list of result candidates and associated distance information, without specific rankings, and the ranking of the result images are performed by the root server 3002 when the result lists from multiple leaf servers are merged. In this case, leaf server 1 (e.g., 3012a) returns result list R1 and leaf server 2 (e.g., 3012b) returns result list R2. The result lists optionally include image IDs or the image vectors of the result images, such that the root server 3002 is able to identify the result images from the image corpus using the information in the result lists.

The root server 3002 receives the result lists from the identified leaf servers (e.g., 3012a and 3012b) handling the query, and merges the result lists using a merging engine 5010. The merging engine 5010 optionally applies filters for the result images to remove duplicate results, inappropriate results, or other results that do not conform to certain standards. The merge engine 5010 ranks the results as a whole based on, for example, the quality scores of the result images. The quality of the images, depend on multiple factors, such as the sources of the images, the popularity of the images, the user feedback for the images and so on. Alternatively, the merge engine simply adjust the ranking of some result images based on the quality scores of the images The merging engine 5010 of the root server 3002 creates an integrated result list 5012 based on the result sets returned from the leaf servers, and sends the integrated result list 5012 to the client device 5002. When formatting the integrated result list 5012, the merging engine 5010 consults the image index to obtain the source images of the result images or links to the source images from the image index. The integrated result list 5012 presents the result images, thumbnails of the result images, or links to the result images as a webpage, for example.

Figure 6:
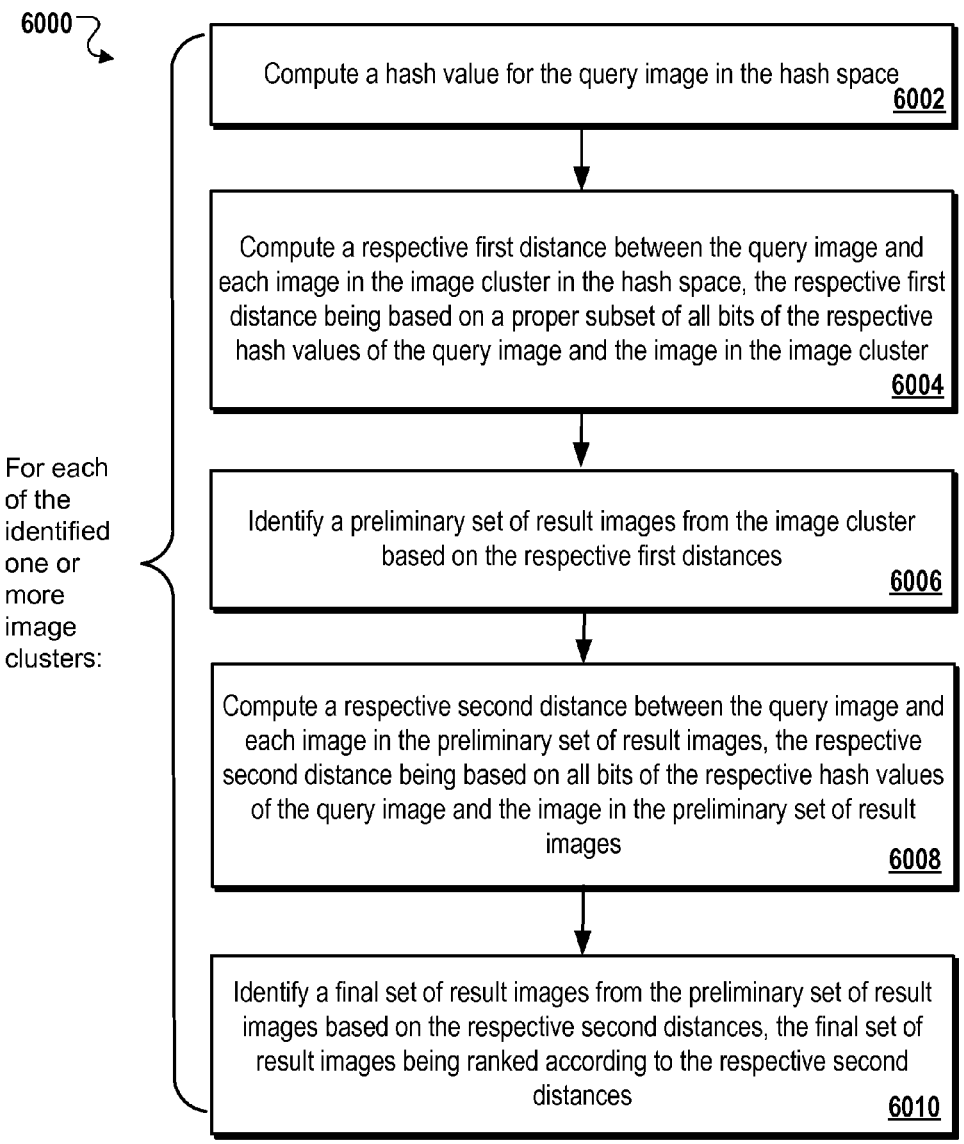
FIG. 6 is a flow diagram of an example two-stage nearest-neighbor search process implemented on a leaf server of the example distributed image retrieval system of FIG. 3.

FIG. 6 is a flow diagram of an example two-stage nearest-neighbor search in a locality-sensitive hash space. The process (6000) is implemented on a leaf server of an example distributed image retrieval system. The process is performed on an image cluster that is assigned to the leaf server and to which the query image belongs in the multi-dimensional feature space. In some implementations, this process is performed on multiple leaf servers in parallel to search for the nearest-neighbors of the same image query in multiple image clusters.

The process begins when a hash value is computed for the query image in the hash space (6002). To compute the hash value, a locality-sensitive hash function is applied to the feature vector of the query image in the multidimensional feature space, and a corresponding hash value is obtained in the hash space. In some implementations, the locality-sensitive hash function is a random projection into the Hamming space. For a Hamming space of dimensionality N, the corresponding hash value is a binary string of size N (e.g., 1024 bits). A suitable size for the Hamming space is selected based on the memory and computing resources available at each leaf server, for example. Larger hash sizes improve the accuracy for the nearest-neighbor search, but also increases memory usage and computation time.

Next, a respective first distance is computed between the query image and each image in the image cluster in the hash space, where the respective first distance is based on a proper subset of all bits of the respective hash values of the query image and the image in the image cluster (6004). Each image in the image cluster to which the query image belongs is stored on the leaf server as a key-value pair in a hash table, for example. Each image feature vector has a corresponding hash value in the hash space. Each image in the image cluster is represented by a hash value of the size N in the hash space, as is the query image.

The distance function used to compute the image distances in the hash space is defined depending on the particular hash function used to map the image cluster from the feature space to the hash space. The distance function is defined such that the relative distances between two points in the hash space has a high probability of resembling the relative distances between two points in the multi-dimensional feature space. If the hash space is the Hamming space, the distance is the Hamming distance between the hash values of the query image and the image in the image cluster.

When calculating the first distances, only a proper subset of all bits (e.g., a proper sub-sequence) of the hash value of used. For a particular example, if the full hash value has 1024 bits, only the first 200 bits are used to compute the first distances. Since the time it takes to compute the distances increases with the size of the hash value and the number of images, if there are many images in the image cluster, the total amount of time to compute the distances may be impractical for real-time retrieval of images. Therefore, using only a small segment of the full hash value to compute the distances allows a preliminary set of results to be found quickly.

After the first distances are computed for each image in the image cluster, a preliminary set of result images is identified from the image cluster based on the respective first distances of the images in the image cluster (6006). The preliminary set of result images include images whose first distances are the smallest among all the first distances calculated. The preliminary set of result images (e.g., 1000-10000) is a small fraction of the image cluster (e.g., 5M), but is many times the total number of desired results (e.g., 100). The number of bits used to calculate the first distances can be a fraction (e.g., 1/10) of all bits of the hash value (e.g., 1024 bits).

After the preliminary set of result images are identified, a respective second distance between the query image and each image in the preliminary set of result images is computed, where the respective second distance is based on all bits (e.g., the entire bit sequence) of the respective hash values of the query image and the image in the preliminary set of result images (6008). For example, if the size of the hash value is 1024 bits, and the first distances are computed using a 200-bit segment of the hash value, then the second distances are computed using the entire 1024 bits of the hash value. Although the entire hash value is used, since the set of preliminary result images is only a fraction of the total number of images in the image cluster, significant timesaving can be achieved using this two-stage nearest-neighbor search method.

After the second distances are computed between the query image and the images in the preliminary set of result images, a final set of result images is identified from the preliminary set of result images based on the respective second distances (6010). The final set of result images is optionally ranked according to the respective second distances. The shorter the distance between the images, the more similar are the images in terms of the features in the multi-dimensional feature space.

Although LSH-based nearest-neighbor search only provides an approximate solution, the accuracy of the nearest-neighbor search is high when a large hash size is used. Furthermore, since perception of image similarity is not completely described by the distance between image vectors in the feature space, a small amount error in identifying the real nearest-neighbors in the feature space does not significantly affect the performance of the image retrieval system.

Further stages in the nearest-neighbor search can be implemented, if the cluster size and the hash values are both very large. In some implementations, different leaf servers implement slightly different hash-based nearest-neighbor search methods within the leaf server's assigned clusters.

In addition to ranking the result images in the final set of result images based on the second distances in the hash space, additional factors can taken into consideration to rank or adjust the ranking of the result images at the leaf-level. For example, an image quality measure can be used to rank or adjust the ranking of the result images. Better image quality can potentially boost the ranking of a particular image. Other filters can be applied to the result images to remove duplicates or inappropriate images, before the final set of result images is sent back to the root server.

Figure 7:
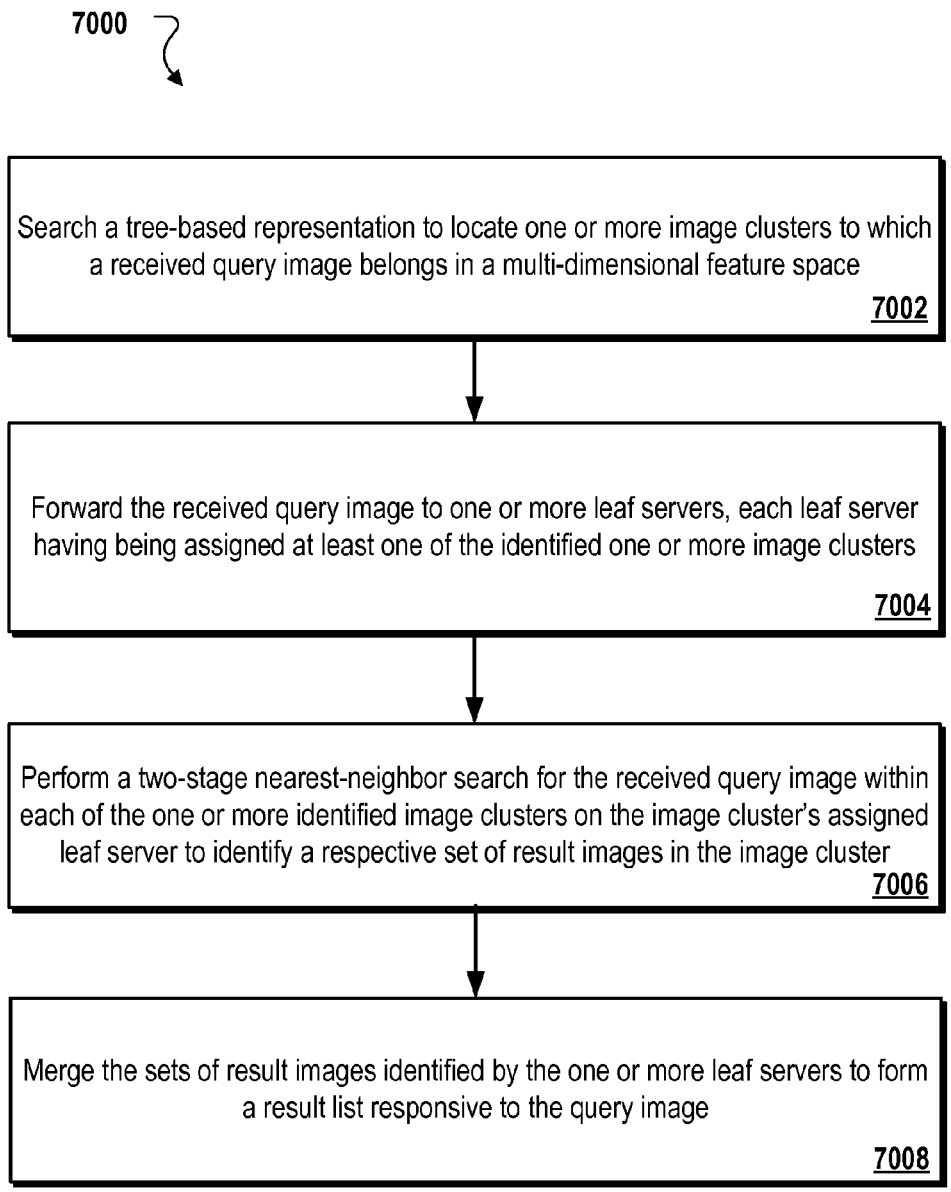
FIG. 7 is a flow diagram of an example process for an image-based search on a distributed image retrieval system.

FIG. 7 is a flow diagram illustrating example processing of an image query through a distributed image retrieval system.

The process begins when a query image is received at a root server. A tree-based representation on the root server is searched to identify one or more image clusters to which the received query image belongs in a multi-dimensional feature space (7002). The tree-based representation includes a root-node and a plurality of leaf nodes. The root node represents all images in the image corpus and each leaf node represents a respective image cluster in the image corpus. Example methods for building the tree-based representation on the root server is described with respect to FIG. 3, for example. The root server is configured to communicate with a plurality of leaf servers, and assigns a subset of image clusters to each of the plurality of leaf servers. In some implementations, the root server maintains a mapping between the image clusters and their assigned leaf servers.

After the query is received and one or more image clusters to which the received query image belongs in the multi-dimensional feature space are identified, the received query image is forward to one or more leaf servers that have been assigned the one or more identified image clusters (7004). Each of the one or more leaf servers has access to a respective hash value for the query image and each image in the leaf server's assigned image clusters.

A two-stage nearest neighbor search is performed for the received query image within each of the one or more identified image clusters on the image cluster's assigned leaf server to identify a set of result images in the image cluster (7006). The first stage of the nearest neighbor search being performed according to distances computed using a proper subset of all bits of the hash values of the query image and each image in the image cluster, and the second stage of the nearest-neighbor search is performed according to distances computed using all bits of the hash values of the query image and each image within a preliminary set of results produced by the first stage.

Once the results have been obtained by the leaf server(s), the sets of result images identified by the one or more leaf servers are merged to form a result list responsive to the query image (7008). The result merging is performed, for example, by the root server.

Figure 8:
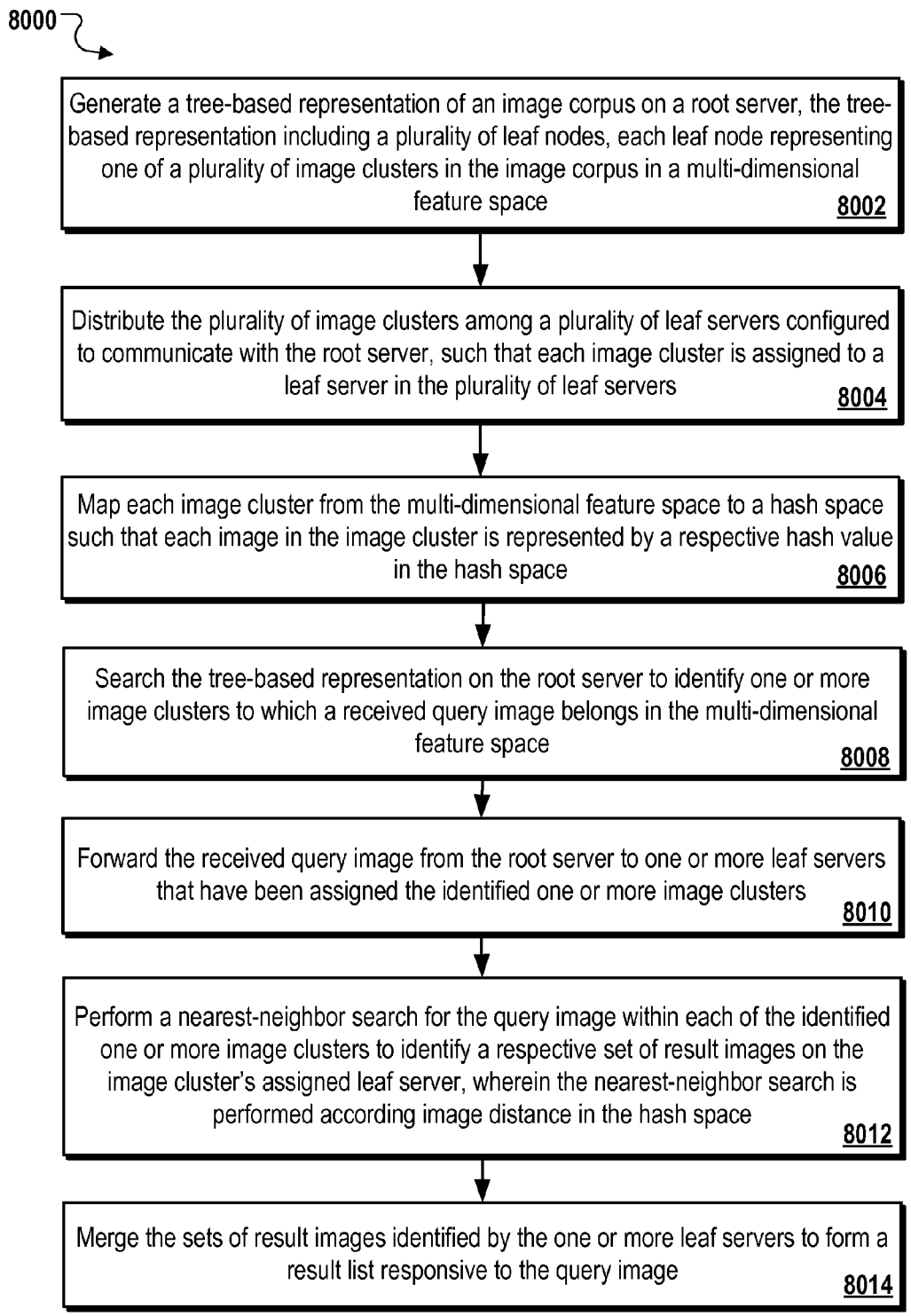
FIG. 8 is a flow diagram of an example process for building a distributed image retrieval system and performing an image-based search on the distributed image retrieval system.

FIG. 8 is a flow diagram illustrating example process 8000 for building a distributed image retrieval system and performing an image query on the distributed image retrieval system.

The system building starts when a tree-based representation of an image corpus in a multi-dimensional feature space is generated on a root server (8002). The tree-based representation includes a plurality of leaf nodes, and each leaf node represents one of a plurality of image clusters in the image corpus in a multi-dimensional feature space. The tree-based representation of the image corpus is, for example, one of a K-d tree, a spill-tree, a metric tree, a vantage point tree, or a hybrid tree. In some implementations, the tree-based representation is a spill-tree and at least one image in the image corpus is included in more than one of the plurality of image clusters represented by the leaf nodes of the spill-tree. In some implementations, the multi-dimensional feature space is defined by a plurality of image features, and each image in the image corpus is represented by a point in the multi-dimensional image space.

After the tree-based representation of the image corpus is generated, the plurality of image clusters represented by the leaf nodes of the tree-based representation are distributed among a plurality of leaf servers configured to communicate with the root server, such that each image cluster is assigned a leaf server in the plurality of leaf servers (8004). In some implementations, the plurality of image clusters are distributed among the plurality of leaf servers according to an estimated search volume targeting each image cluster. In some cases, at least one leaf server is assigned more than one image cluster, and at least one image cluster is replicated on more than one leaf server. The assignment of image clusters to leaf servers is effective in managing load distribution among the different leaf servers. If a cluster is too large or if a cluster is searched too frequently, that cluster may be assigned to a faster or more powerful leaf server, or assigned to a leaf server without sharing with other clusters. In some cases, the assignment of image clusters to leaf servers are changed based on actual load data collected during operation of the image retrieval system. A mapping between the plurality of image clusters and the plurality of leaf servers is optionally stored on the root server and updated accordingly.

Each image cluster is mapped from the multi-dimensional feature space to a hash space such that each image in the image cluster is represented by a respective hash value in the hash space (8006). For each image in the image cluster, the mapping is accomplished by applying a hash function to a respective feature vector of the image in the multi-dimensional feature space to obtain the respective hash value of the image in the hash space. The hash function is locality-sensitive, and can be selected from a family of locality-sensitive hash functions. In some implementations, the locality-sensitive hash function is a random projection of the image feature vector into the Hamming space, and the resulting hash value is a bit sequence. The size of the bit sequence is determined by the dimensionality of the Hamming space. In some implementations, the hash function applied to each image cluster and the hash space are unique to each image cluster. An easy way to obtain multiple unique locality-sensitive hash functions is by concatenating multiple locality-sensitive functions that are selected randomly from a family of locality-sensitive functions. In some implementations, the hash values of the images in each image cluster are stored with the images' feature vectors and at the image cluster's assigned leaf servers as key-value pairs in a hash table.

After the tree-based representation of the image corpus is generated on the root server, the image clusters formed in the image corpus are assigned to their respective leaf servers, and the image feature vectors are mapped to the desired hash space and made available to the leaf servers, the image retrieval system can start operations to retrieve approximate nearest neighbors of a query image in the feature space. These nearest-neighbors of the query image in the multi-dimensional feature space are returned as similar images responsive to an image query in the form of a query image.

After a query image is received, the tree-based representation on the root server is searched to identify one or more image clusters to which the received query image belongs in the multi-dimensional feature space (8008). To search the tree-based representation on the root server, a respective feature vector is computed for the received query image in the multi-dimensional feature space. Then, the tree-based representation is traversed using the feature vector of the query image to reach one or more leaf nodes of the tree-based representation, where the one or more leaf nodes represent the one or more image clusters to which the query image belongs in the multi-dimensional feature space.

Once the one or more image clusters are identified, the query image is forwarded to one or more leaf servers that have been assigned the identified one or more image clusters (8010). The one or more leaf servers are identified based on the mapping stored on or accessible to the root server.

A nearest neighbor search for the query image is performed within each of the identified one or more image clusters to identify a respective set of result images on the image cluster's assigned leaf server, where the nearest-neighbor search is performed according to the image distance in the hash space (8012). In some implementations, for each of the identified one or more image clusters, a two-stage nearest-neighbor search is performed in the hash space. An example process for the two-stage nearest neighbor search is described with respect to FIG. 6.

After the results are returned from the leaf servers to the root server, the sets of result images identified by the one or more leaf servers are merged at the root server to form an integrated result list responsive to the query image (8014). In some implementations, one or more filtering criteria are applied to the sets of result images to remove inappropriate and duplicate images; and the remaining result images in the sets of result images are ranked according to a measure of quality for each of the remaining result images.

The methods and systems are described in this specification in terms of an image retrieval system. However, search and retrieval of other objects and documents (e.g., videos, data structures, etc.) can be implemented using similar methods.

Figure 9:
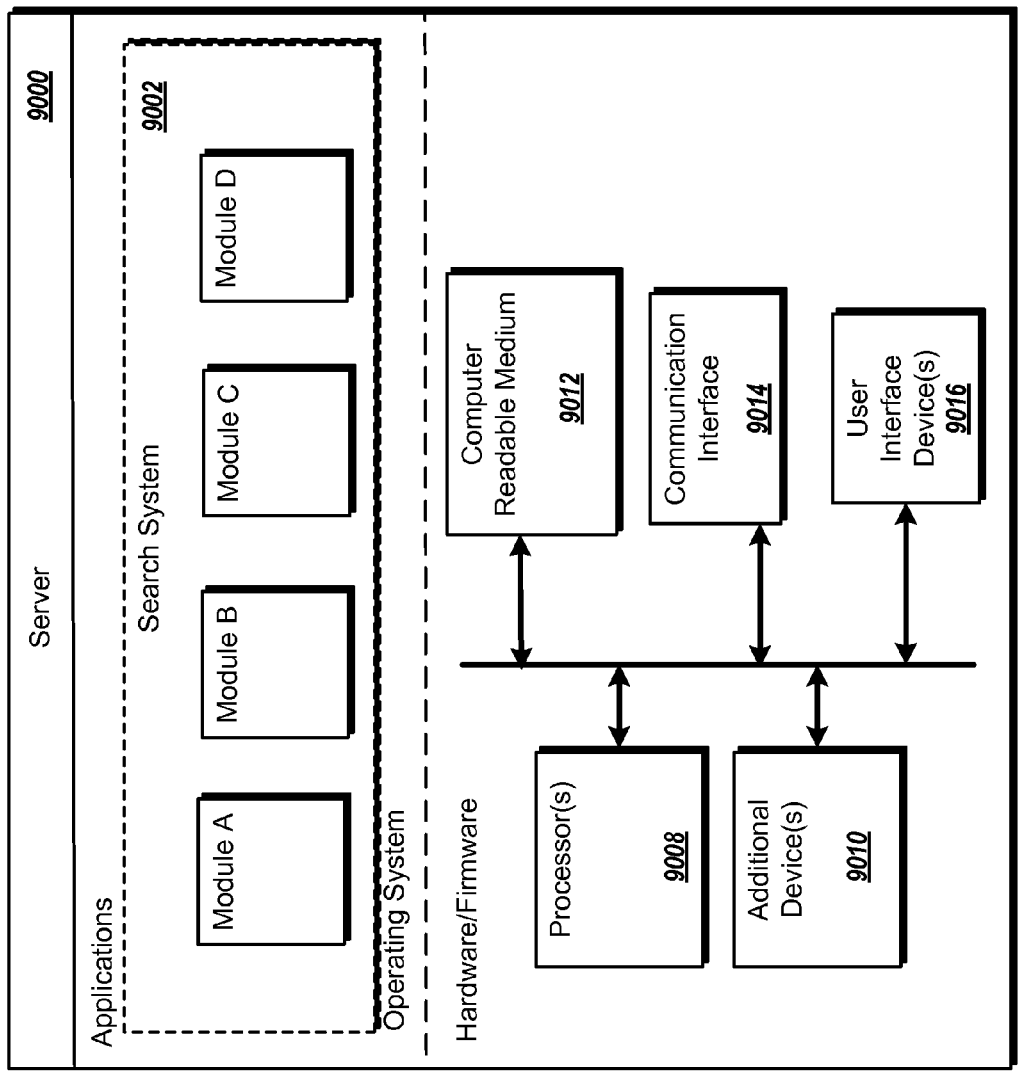
FIG. 9 illustrates example architecture of a server.

FIG. 9 illustrates example architecture of a server 9000.

The server 9000 consists of one or more data processing apparatus. While only one data processing apparatus is shown in FIG. 9, multiple data processing apparatus can be used. The server 9000 includes various modules, e.g. executable software programs, including a search system 9002. The search system 9002 includes various modules serving different functionalities of the search system, such as an indexing, searching, ranking, communication, and so on. Each module runs as part of the operating system on the server, runs as an application on the server, or runs as part of the operating system and part of an application on the server. These modules can implement the all or part of the processes described with respect to FIGS. 6-8.

The server 9000 can also have hardware or firmware devices including one or more processors 9008, one or more additional devices 9010, a computer readable medium 9012, a communication interface 9014, and one or more user interface devices 9016. Each processor 6008 is capable of processing instructions for execution within the server 9002. In some implementations, the processor 9008 is a single-threaded processor. In other implementations, the processor 9008 is a multi-threaded processor. Each processor 9008 is capable of processing instructions stored on the computer readable medium 9012 or on a storage device (e.g., an additional device 9010). The server 9000 uses its communication interface 9014 to communicate with one or more computers, for example, over a network. Examples of user interface devices 9016 include a display, a camera, a speaker, a microphone, a tactile feedback device, a keyboard, and a mouse.

The server 9000 can store instructions that implement operations associated with the modules described above, for example, on the computer readable medium 9012 or one or more additional devices 9010, for example, one or more of a floppy disk device, a hard disk device, an optical disk device, or a tape device. In some implementations, the data processing apparatus 9002 also stores additional data, for example, user preference data, parent-query associations, candidate siblings, final siblings, or other data, on the computer readable medium 9012 or one or more additional devices 9010.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. Accordingly, other embodiments are within the scope of the following claims.

What is claimed is:

1. A computer-implemented method comprising:
generating a tree-based representation of an image corpus on a root server, the tree-based representation including a plurality of leaf nodes, each leaf node representing one of a plurality of image clusters in the image corpus in a multi-dimensional feature space;

distributing the plurality of image clusters among a plurality of leaf servers configured to communicate with the root server, such that each image cluster is assigned to a leaf server in the plurality of leaf servers;

mapping the each image cluster from the multi-dimensional feature space to a hash space such that each image in the each image cluster is represented by a respective hash value in the hash space;

searching the tree-based representation on the root server to identify one or more image clusters to which a received query image belongs in the multi-dimensional feature space, wherein the query image and images in the identified one or more image clusters are each represented by the respective hash value in the hash space;

forwarding the received query image from the root server to one or more leaf servers that have been assigned the identified one or more image clusters; and performing a nearest-neighbor search for the query image within each of the identified one or more image clusters to identify a respective set of result images on the image cluster's assigned leaf server, wherein the nearest-neighbor search is performed according to image distance in the hash space; and wherein performing the nearest neighbor search in the hash space further comprises performing a two-stage nearest-neighbor search for the received query image within each of the identified one or more image clusters on the image cluster's assigned leaf server, and wherein said two-stage nearest-neighbor search comprises:

a first stage search being performed according to distances computed using a subset of all bits of the hash values of the query image and the each image in the image cluster, and a second stage search being performed according to distances computed using all bits of the hash values of the query image and each image within a preliminary set of results produced by the first stage.

2. The method of claim 1, wherein the tree-based representation of the image corpus is one of a K-d tree, a spill-tree, a metric tree, a vantage-point tree, or a hybrid tree.

3. The method of claim 1, wherein the tree-based representation is a spill-tree and at least one image in the image corpus is included in more than one of the plurality of image clusters.

4. The method of claim 1, wherein distributing the plurality of image clusters among the plurality of leaf servers further comprises:

distributing the plurality of image clusters among the plurality of leaf servers according to an estimated search volume targeting each image cluster.

5. The method of claim 4, wherein at least one leaf server is assigned more than one image cluster or at least one image cluster is replicated on more than one leaf server.

6. The method of claim 1, wherein mapping each image cluster from the multi-dimensional feature space to the hash space further comprises:

for each image in the image cluster, applying a locality-sensitive hash function to a respective feature vector of the image in the multi-dimensional feature space to obtain the respective hash value of the image in the hash space.

7. The method of claim 6, wherein the locality-sensitive hash function is a random projection into a Hamming space, and each hash value is a bit sequence.

8. The method of claim 7, wherein the locality-sensitive hash function and the hash space are unique to each image cluster.

9. The method of claim 1, wherein searching the tree-based representation on the root server further comprises:

computing a respective feature vector of the query image in the multi-dimensional feature space; and traversing the tree-based representation using the respective feature vector of the query image to reach one or more leaf nodes of the tree-based representation, the one or more leaf nodes representing the one or more image clusters to which the query image belongs in the multi-dimensional feature space.

10. The method of claim 1, further comprising:

merging at the root server the sets of result images identified by the one or more leaf servers to form a result list responsive to the query image, wherein the merging comprises:

applying one or more filtering criteria to the sets of result images to remove inappropriate and duplicate images; and ranking the remaining result images in the sets of result images according to a measure of quality for each of the remaining result images.

11. A system comprising:

a root server, the root server including one or more processors and memory, the memory storing data for a tree-based representation for an image corpus, the tree-based representation including a plurality of leaf nodes, each leaf node representing one of a plurality of image clusters in the image corpus in a multi-dimensional feature space; and a plurality of leaf servers configured to communicate with the root server, each leaf server including a data processing apparatus, each image cluster being assigned to a leaf server in the plurality of leaf servers, wherein the each image cluster is mapped from the multi-dimensional feature space to a hash space such that each image in the each image cluster is represented by a respective hash value in the hash space;

wherein the root server is programmed to perform operations comprising:

searching the tree-based representation to identify one or more image clusters to which a received query image belongs in the multi-dimensional feature space, wherein the query image and images in the identified one or more image clusters each represented by the respective hash value in the hash space; and forwarding the received query image to one or more leaf servers that have been assigned the identified one or more image clusters; and wherein each leaf server is programmed to perform operations comprising:

performing a nearest-neighbor search for the query image within each of the identified one or more image clusters to identify a respective set of result images on the image cluster's assigned leaf server, wherein the nearest-neighbor search is performed according to image distance in the hash space, and wherein performing the nearest neighbor search in the hash space further comprises performing a two-stage nearest-neighbor search for the received query image within each of the identified one or more image clusters on the image cluster's assigned leaf server, and wherein the two-stage nearest neighbor search comprises:

a first stage search being performed according to distances computed using a subset of all bits of the hash values of the query image and the each image in the image cluster, and a second stage search being performed according to distances computed using all bits of the hash values of the query image and each image within a preliminary set of results produced by the first stage.

12. The system of claim 11, wherein the tree-based representation of the image corpus is one of a K-d tree, a spill-tree, a metric tree, a vantage-point tree, or a hybrid tree.

13. The system of claim 12, wherein the tree-based representation is a spill-tree and at least one image in the image corpus is included in more than one of the plurality of image clusters.

14. The system of claim 11, wherein each image cluster is being assigned to a leaf server in the plurality of leaf servers according to an estimated search volume targeting each image cluster.

15. The system of claim 14, wherein at least one of the leaf servers in the plurality of leaf servers is assigned more than one image cluster or at least one image cluster is replicated on more than one leaf server in the plurality of leaf servers.

16. The system of claim 11, wherein each image cluster is mapped from the multi-dimensional feature space to a hash space by:

for each image in the image cluster, applying a locality-sensitive hash function to a respective feature vector of the image in the multi-dimensional feature space to obtain the respective hash value of the image in the hash space.

17. The system of claim 16, wherein the locality-sensitive hash function is a random projection into a Hamming space, and each hash value is a bit sequence.

18. The system of claim 17, wherein the locality-sensitive hash function and the hash space are unique to each image cluster.

19. The system of claim 11, wherein searching the tree-based representation on the root server further comprises:

computing a respective feature vector of the query image in the multi-dimensional feature space; and traversing the tree-based representation using the respective feature vector of the query image to reach one or more leaf nodes of the tree-based representation, the one or more leaf nodes representing the one or more image clusters to which the query image belongs in the multi-dimensional feature space.

20. The system of claim 11 wherein the root server is further programmed to performing operations comprising:

merging at the root server the sets of result images identified by the one or more leaf servers to form a result list responsive to the query image, wherein the merging comprises:

applying one or more filtering criteria to the sets of result images to remove inappropriate and duplicate images; and ranking the remaining result images in the sets of result images according to a measure of quality for each of the remaining result images.

21. A computer-readable storage device having instructions stored thereon which, when executed by one or more computers, cause the one or more computers to perform operations comprising:

generating a tree-based representation of an image corpus on a root server, the tree-based representation including a plurality of leaf nodes, each leaf node representing one of a plurality of image clusters in the image corpus in a multi-dimensional feature space;

distributing the plurality of image clusters among a plurality of leaf servers configured to communicate with the root server, such that each image cluster is assigned to a leaf server in the plurality of leaf servers;

mapping the each image cluster from the multi-dimensional feature space to a hash space such that each image in the each image cluster is represented by a respective hash value in the hash space;

searching the tree-based representation on the root server to identify one or more image clusters to which a received query image belongs in the multi-dimensional feature space, wherein the query image and images in the identified one or more image clusters are each represented by the respective hash value in the hash space;

forwarding the received query image from the root server to one or more leaf servers that have been assigned the identified one or more image clusters; and performing a nearest-neighbor search for the query image within each of the identified one or more image clusters to identify a respective set of result images on the image cluster's assigned leaf server, wherein the nearest-neighbor search is performed according to image distance in the hash space; and wherein performing the nearest neighbor search in the hash space further comprises performing a two-stage nearest-neighbor search for the received query image within each of the identified one or more image clusters on the image cluster's assigned leaf server, and wherein said two-stage nearest-neighbor search comprises:

a first stage search being performed according to distances computed using a subset of all bits of the hash values of the query image and the each image in the image cluster, and a second stage search being performed according to distances computed using all bits of the hash values of the query image and each image within a preliminary set of results produced by the first stage.

22. The computer-readable storage device of claim 21 wherein the tree-based representation of the image corpus is one of a K-d tree, a spill-tree, a metric tree, a vantage-point tree, or a hybrid tree.

23. The computer-readable storage device of claim 21 wherein the tree-based representation is a spill-tree and at least one image in the image corpus is included in more than one of the plurality of image clusters.

24. The computer-readable storage device of claim 21 wherein distributing the plurality of image clusters among the plurality of leaf servers further comprises:

distributing the plurality of image clusters among the plurality of leaf servers according to an estimated search volume targeting each image cluster.

25. The computer-readable storage device of claim 24 wherein at least one leaf server is assigned more than one image cluster or at least one image cluster is replicated on more than one leaf server.

26. The computer-readable storage device of claim 21 wherein mapping each image cluster from the multi-dimensional feature space to the hash space further comprises:

for each image in the image cluster, applying a locality-sensitive hash function to a respective feature vector of the image in the multi-dimensional feature space to obtain the respective hash value of the image in the hash space.

27. The computer-readable storage device of claim 26, wherein the locality-sensitive hash function is a random projection into a Hamming space, and each hash value is a bit sequence.

28. The computer-readable storage device of claim 27 wherein the locality-sensitive hash function and the hash space are unique to each image cluster.

29. The computer-readable storage device of claim 21 wherein searching the tree-based representation on the root server further comprises:

computing a respective feature vector of the query image in the multi-dimensional feature space; and traversing the tree-based representation using the respective feature vector of the query image to reach one or more leaf nodes of the tree-based representation, the one or more leaf nodes representing the one or more image clusters to which the query image belongs in the multi-dimensional feature space.

30. The computer-readable storage device of claim 21, wherein the operations further comprise:

merging at the root server the sets of result images identified by the one or more leaf servers to form a result list responsive to the query image, wherein the merging comprises:

applying one or more filtering criteria to the sets of result images to remove inappropriate and duplicate images; and ranking the remaining result images in the sets of result images according to a measure of quality for each of the remaining result images.

\* \* \* \* \*

UNITED STATES PATENT AND TRADEMARK OFFICE
CERTIFICATE OF CORRECTION

| | |
|---|---|
| PATENT NO. | : 8,352,494 B1 |
| APPLICATION NO. | : 12/632681 |
| DATED | : January 8, 2013 |
| INVENTOR(S) | : Mihai Badoiu |

It is certified that error appears in the above-identified patent and that said Letters Patent is hereby corrected as shown below:

Title Page, Column 1, under Other Doc, Line 6 – delete "FOCS" and insert -- FOCUS --, therefor Title Page, Column 2, Line 6 – delete "IIEEE" and insert -- IEEE --, therefor Claim 13, Column 25, Line 13 – delete "claim 12," and insert -- claim 11, --, therefor Signed and Sealed this
Second Day of April, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,352,494 B1 | Page 1 of 1 |
| APPLICATION NO. | : 12/632681 | |
| DATED | : January 8, 2013 | |
| INVENTOR(S) | : Mihai Badoiu | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 228 days.

Signed and Sealed this
Thirtieth Day of July, 2013

Teresa Stanek Rea
*Acting Director of the United States Patent and Trademark Office*